United States Patent
Boelter

(10) Patent No.: US 9,461,927 B2
(45) Date of Patent: Oct. 4, 2016

(54) METHOD, DEVICE, AND SYSTEM FOR DELAYING PACKETS DURING A NETWORK-TRIGGERED WAKE OF A COMPUTING DEVICE

(75) Inventor: Joshua Boelter, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 13/976,031

(22) PCT Filed: Mar. 31, 2012

(86) PCT No.: PCT/US2012/031744
§ 371 (c)(1),
(2), (4) Date: Oct. 16, 2013

(87) PCT Pub. No.: WO2013/147900
PCT Pub. Date: Oct. 3, 2013

(65) Prior Publication Data
US 2014/0032955 A1    Jan. 30, 2014

(51) Int. Cl.
*G06F 1/00*    (2006.01)
*G06F 13/42*    (2006.01)
(Continued)

(52) U.S. Cl.
CPC ............ *H04L 47/32* (2013.01); *G06F 1/3206* (2013.01); *G06F 1/3209* (2013.01);
(Continued)

(58) Field of Classification Search
CPC ... G06F 1/3287; G06F 1/3209; G06F 9/4418
USPC .......... 713/323, 324, 401; 709/200; 370/912
See application file for complete search history.

(56) References Cited

U.S. PATENT DOCUMENTS 7,392,279 B1    6/2008  Chandran et al.
7,529,958 B2 *  5/2009  Roth .................... G06F 1/3203
                                                    713/300

(Continued)

FOREIGN PATENT DOCUMENTS

JP    2006259906 A    9/2006
JP    2012020515 A    2/2012
WO    2013147900 A1   10/2013

OTHER PUBLICATIONS

International Search Report and Written Opinion received for International Patent Application No. PCT/US2012/031744, mailed Oct. 30, 2012, 9 pages.

(Continued)

*Primary Examiner* — Ji H Bae
(74) *Attorney, Agent, or Firm* — Barnes & Thornburg LLP

(57) ABSTRACT

A method, device, and system for delaying delivery of incoming packets during a network-triggered wake of a host computing device includes receiving one or more packets from a remote computing device over a network. The host computing device holds or buffers incoming packets to delay delivery while one or more components transition from a low-power power-managed state to an operational power-managed state. The host computing device may hold and release the packets after passage of a reference time. Additionally, the host computing device may hold and release, buffer and inject, or buffer and replay the packets upon receiving notification that one or more components has transitioned from a low-power state to an operational state. The delayed packets may be acknowledged to the remote computing device to reduce or minimize the overall time needed to establish a connection.

18 Claims, 7 Drawing Sheets

(51) Int. Cl.
| | |
|---|---|
| *G06F 15/16* | (2006.01) |
| *H04L 12/823* | (2013.01) |
| *G06F 1/32* | (2006.01) |
| *H04W 52/02* | (2009.01) |
| *H04L 12/12* | (2006.01) |
| *G06F 9/44* | (2006.01) |

(52) U.S. Cl.
CPC ............ *G06F 1/3287* (2013.01); *H04L 12/12* (2013.01); *H04W 52/0229* (2013.01); *G06F 9/4418* (2013.01); *Y02B 60/50* (2013.01)

(56) References Cited

U.S. PATENT DOCUMENTS

| | | | |
|---|---|---|---|
| 7,574,195 | B2 | 8/2009 | Krasner et al. |
| 7,603,574 | B1* | 10/2009 | Gyugyi ................. H04L 12/12 370/232 |
| 8,010,821 | B2 | 8/2011 | Edwards et al. |
| 8,077,607 | B2 | 12/2011 | Raszuk et al. |
| 2002/0137489 | A1 | 9/2002 | Dutta et al. |
| 2003/0226050 | A1* | 12/2003 | Yik ....................... G06F 1/3209 713/324 |
| 2009/0019193 | A1* | 1/2009 | Luk ........................... G06F 5/06 710/52 |
| 2009/0135751 | A1* | 5/2009 | Hodges ................ G06F 1/3209 370/311 |
| 2009/0144573 | A1* | 6/2009 | Ohhashi ............. G03G 15/5004 713/323 |
| 2010/0115302 | A1* | 5/2010 | Cho ..................... G06F 1/3203 713/310 |
| 2010/0257391 | A1 | 10/2010 | Dring et al. |
| 2010/0271198 | A1 | 10/2010 | Boling et al. |
| 2011/0066868 | A1 | 3/2011 | Atkinson |
| 2011/0098016 | A1 | 4/2011 | Hatton |
| 2011/0213992 | A1* | 9/2011 | Satsangi .............. G06F 1/3209 713/300 |
| 2011/0302401 | A1* | 12/2011 | Yokoyama ........... G06F 1/3209 713/2 |
| 2013/0198538 | A1* | 8/2013 | Diab .................... G06F 1/3278 713/310 |
| 2014/0161127 | A1* | 6/2014 | Murakami .......... H04L 49/9078 370/392 |

OTHER PUBLICATIONS

Agarwal et al., "Somniloquy: Augmenting Network Interfaces to Reduce PC Energy Usage," NSDI'09 Proceedings of the 6th USENIX Syymposium on Networked Systems Design and Implementaion, 2009, 16 pages.

Reich et al., "Sleepless in Seattle No Longer," USENIXATC'10 Proceedings of the 2010 USENIX Conference on USENIX Annual Technical conference, 2010, 14 pages.

Microsoft Corp., "Power Management for Network Devices in Windows 7," available: [http://technet.microsoft.com/en-us/library/ee617165.aspx], Sep. 22, 2009, 10 pages.

"Wmiconfig," Openmoko, Jul. 10, 2009, available: [http://wiki.openmoko.org/wiki/Wmiconfig], 2 pages.

"Wake-on-LAN," Wikipedia, The Free Encyclopedia, available: [http://en.wikipedia.org/w/index.php?title=Wake-on-LAN&oldid=479553391], accessed Mar. 16, 2012, 9 pages.

International Search Report and Written Opinion received for PCT Application No. PCT/US2012/031750, mailed on Nov. 26, 2012, 11 pages.

"In car entertainment," Wikipedia, The Free Encyclopedia, available: [http://en.wikipedia.org/w/index.php?title=In_car_entertainment&oldid=457701186], edited Oct. 27, 2011, 2 pages.

"Automotive navigation system," Wikipedia, The Free Encyclopedia, available: [http://en.wikipedia.org/w/index.php?title=Automotive_navigation_system&oldid=457353694], edited Oct. 25, 2011, 9 pages.

English translation of Japanese Office Action mailed Oct. 13, 2015 in connection with Japanese Patent Application No. 2015-503176, 3 pages.

Japanese Office Action mailed Oct. 13, 2015 in connection with Japanese Patent Application No. 2015-503176, 3 pages.

First Office Action for Chinese Application No. 201280071904.2, dated Aug. 2, 2016, 11 pages.

* cited by examiner

METHOD, DEVICE, AND SYSTEM FOR DELAYING PACKETS DURING A NETWORK-TRIGGERED WAKE OF A COMPUTING DEVICE

BACKGROUND

Modern computing devices have become increasingly reliant on network-based content and services to provide an enhanced user experience. As a result, host computing devices that provide network-based content and services need to be available to answer requests received over a network. In order to provide such availability, host computing devices are often configured to operate in an always-on and always-connected manner. However, due to raising energy prices and an increasing number of "green initiatives," many network-based content and service providers are utilizing a variety of energy-saving, power-managed states that are typically built into host computing devices such as, for example, low-power sleep or hibernate states.

To increase the availability of network-based content and services, providers may configure host computing devices to remotely wake up upon receiving one or more specially-identified packets, subsequently referred to as packets or wake packets, over the network from a requesting device. Typically, the requesting device expects a reliable connection to be formed with the host computing device shortly after sending a packet to initiate a connection. Unfortunately, it often takes some amount of time for one or more components of the host computing device to reach an operational state after receiving an initial packet that triggers a wake-up. This is especially true in complex host computing devices having a number of interdependent components. As a result, the initial packet is often lost and the requesting computing device is typically required to resend the packet at increasing time intervals, which in turn, increases the overall time needed to establish a connection.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
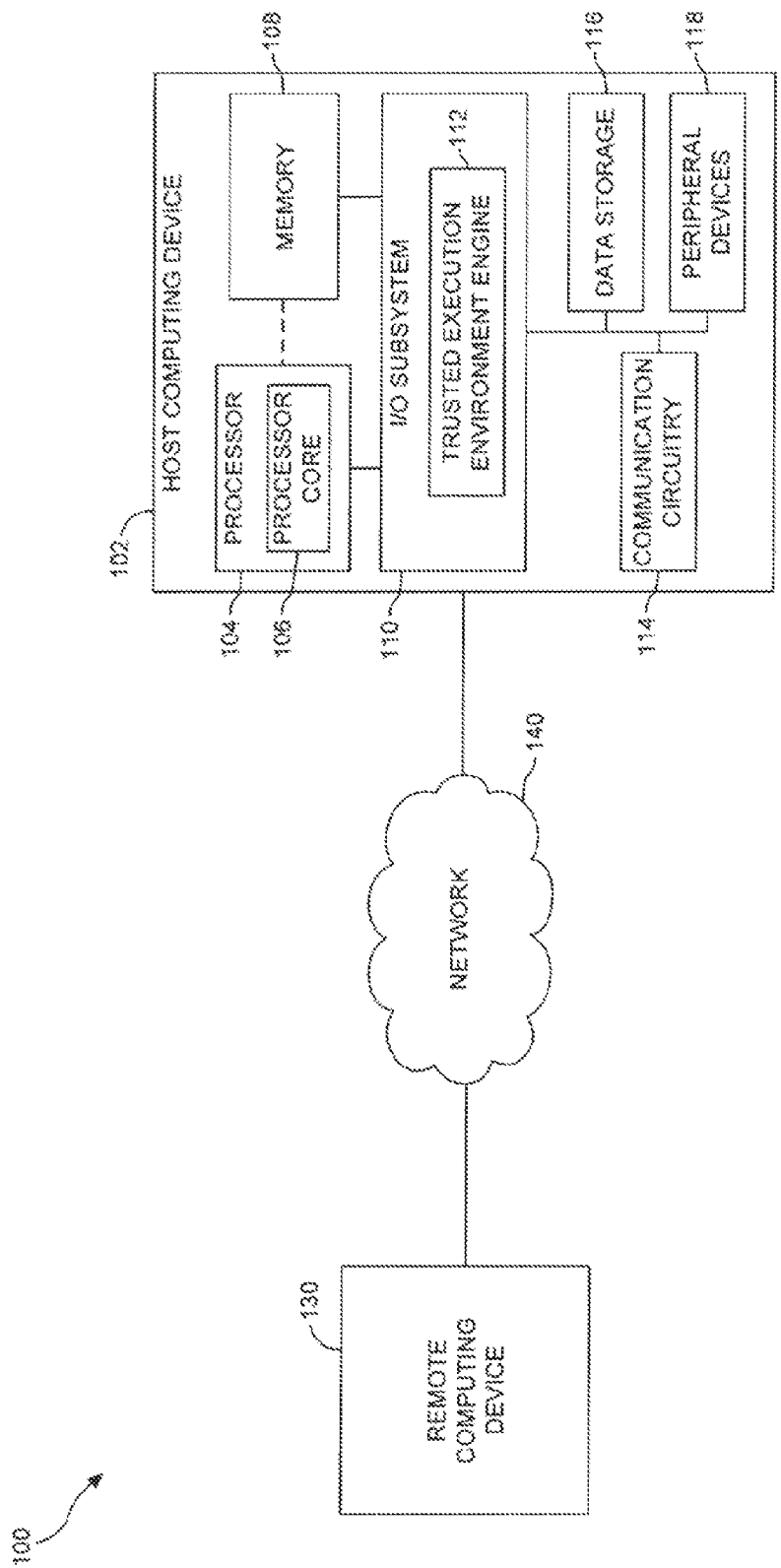
FIG. 1 is a simplified block diagram of at least one embodiment of a system for delaying incoming packets during a network-triggered wake of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for delaying incoming packets during a network-triggered wake of a computing device in a low-power state includes a host computing device 102, a remote computing device 130, and a communications network 140. The host computing device 102 may receive a packet transmitted by the remote computing device 130 over the communications network 140 to initiate and/or maintain a connection. In some embodiments, the received packet may trigger initiation of a wake process to transition the host computing device 102, or one or more components of the host computing device 102, from a low-power state to an operational power state. In such embodiments, the received packet may represent both a wake packet and a packet to initiate and/or maintain a connection. During performance of the wake process, the host computing device 102 may delay delivery of the packet to a destined component while the host computing device 102 achieves a fully operational power state. For example, in some embodiments, the host computing device 102 may delay delivery of the received packet to one or more components (e.g., firmware, hardware, software, operating systems, applications. etc.) while the host computing device 102, or the one or more components of the host computing device 102 achieve a fully operational power state. Once an operational power state has been reached by the host computing device and/or the one or more components of the host computing device (e.g., firmware, hardware, software, operating systems, applications, services, etc.), the host computing device 102 may release, inject, or replay the delayed packet for further processing. In this way, the overall time to connect may can reduced and/or minimized because the host computing device 102 may not be required to wait for a network stack of the remote computing device 130 to resend the initial packet, which otherwise would have been lost. As a result, connection errors can be reduced and the reliability and/or stability of an incoming connection after a network-triggered wake may be improved.

As discussed in more detail below, the host computing device 102 may hold and/or buffer the packet for a reference delay time before releasing the packet for further processing. Additionally or alternatively, in some embodiments, the host computing device 102 may buffer and/or save the packet until being notified that one or more components of the host computing device 102 has reached a fully operational power state and, therefore, is available to further process the packet. Upon receiving such a notification, the host computing device 102 may replay and/or inject the packet for further processing by the one or more available components. It should be understood that in some embodiments, the initial packet received from the remote computing device 130 may comprise a packet for initiating a new connection and/or maintaining an existing connection with the host computing device and/or one or more components (e.g., firmware, hardware, software, operating systems, applications, services, etc.) of the host computing device 102. However, the received packet may, additionally or alternatively, trigger execution of a wake process on the host computing device 102 to transition one or more components from a low-power state to an operational power state or otherwise ready state.

The host computing device 102 may be embodied as any type of computing device for processing data and communicating with remote devices. For example, the host computing device 102 may be embodied as a computing tablet/reader, a laptop, a mobile internet device (MID), a handheld computer, a smart phone, a personal digital assistant, an electronic book reader, or other computing device for storing and processing data and/or communicating, storing, maintaining, and transferring data over a network. In the illustrative embodiment of FIG. 1, the host computing device 102 includes a processor 104, an I/O subsystem 110, a memory 108, a data storage 116, communication circuitry 114, and one or more peripheral devices 118. In some embodiments, several of the foregoing components may be incorporated on a motherboard of the host computing device 102, while other components may be communicatively coupled to the motherboard via, for example, a peripheral port. Furthermore, it should be appreciated that the host computing device 102 may include other components, sub-components, and devices commonly found in a computing device, which are not illustrated in FIG. 1 for clarity of the description.

The host computing device 102, or one or more components of the host computing device 102, may operate in a number of different power-managed states. For example, one or more components of the host computing device 102 may operate in a sleep state (e.g., a low-power state). In such embodiments, components operating in a low-power state are typically inaccessible (e.g., unavailable) to process data from a remote computing device 130 or from other components of the host computing device 102. Additionally or alternatively, in other embodiments, one or more components of the host computing device 102 may operate in a "powered-on" and fully operational power state. Components operating in this power state are typically accessible (e.g., available) to process data from the remote computing device 130 or from other components of the host computing device 102. It should be understood that although the host computing device 102 is described as including low-power and operational power states in the illustrative embodiment, the host computing device 102 may include other power-managed states. For example, the host computing device 102 may additionally or alternatively include any number of other power-managed states (e.g., standby, hibernate, power off, etc.). Additionally, in some embodiments, the host computing device 102 and/or the one or more components of the host computing device 102 may operate in any number of ready states (e.g., available, unavailable, limited availability, etc.).

The processor 104 of the host computing device 102 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the host computing device 102 may include additional processors 104 having one or more processor cores 106.

The I/O subsystem 110 of the host computing device 102 may be embodied as circuitry and/or components to facilitate input/output operations with the processor 104 and/or other components of the host computing device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the host computing device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 108 (as shown by the hashed line in FIG. 1). Additionally, in other embodiments, the I/O subsystem 110 may form a portion of a system-on-a-chip (SoC) and be incorporated, along with the processor 104 and other components of the host computing device 102, on a single integrated circuit chip.

In some embodiments, the I/O subsystem 110 may include a Trusted Execution Environment (TEE) engine 112, which may be embodied as an embedded microprocessor such as a security co-processor, that operates independently of the processor 104 to provide a secure and isolated environment that cannot be accessed by the processor 104 or other components of the host computing device 102. The TEE engine 112 may, in some embodiments, function in an operational power state while the processor 104 and other components of the host computing device 102 are in a low-power state (e.g., sleep, hibernate, etc.). In such embodiments, the TEE engine 112 may facilitate receiving incoming packets, triggering initiation of a wake procedure for the processor 104 or other components of the host computing device 102 in response to receiving the one or more incoming packets, and/or delaying and then releasing or replaying the packets while the host computing device 102, or one or more components thereof, are waking up from the low-power state and transitioning to an operational power state. In doing so, it appears to the remote computing device 130 that the host computing device 102, or one or more components or services of the host computing device 102, is fully available and operational even though the host computing device 102 is operating in a low-power state.

The processor 104 is communicatively coupled to the I/O subsystem 110 via a number of signal paths. These signal paths (and other signal paths illustrated in FIG. 1) may be embodied as any type of signal paths capable of facilitating communication between the components of the host computing device 102. For example, the signal paths may be embodied as any number of wires, cables, light guides, printed circuit board traces, via, bus, intervening devices, point-to-point interconnects, and/or the like.

The memory 108 of the host computing device 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 108 is communicatively coupled to the I/O subsystem 110 via a number of signal paths. Although only a single memory device 108 is illustrated in FIG. 1, the host computing device 102 may include additional memory devices in other embodiments. Various data and software may be stored in the memory device 108. For example, one or more operating systems (OS), applications, programs, libraries, and drivers that make up the software stack executed by the processor 104 may reside in memory 108 during execution.

The data storage 116 may be embodied as any type of device or devices configured for the short-term or long-term storage of data such as, for example, memory devices and circuits, memory cards, hard disk drives, solid-state drives, or other data storage devices. In some embodiments, the data storage 116 may be used to temporarily store one or more incoming packets and/or information associated with the one or more incoming packets while the host computing device 102, or one or more components thereof, are transitioning from a low-power state to an operational power state after a network-triggered wake. Additionally or alternatively, the data storage 116 may be used to temporarily store a current power state for one or more components of the host computing device 102.

The communication circuitry 114 of the host computing device 102 may be embodied as any number of devices and circuitry for enabling communications between the host computing device 102 and the remote computing device 130 over the network 140. For example, the communication circuitry 114 may be embodied as a network interface controller (NIC) in some embodiments. The network 140 may be embodied as any number of various wired and/or wireless communication networks. For example, the network 140 may be embodied as or otherwise include a local area network (LAN), a wide area network (WAN), or a publicly-accessible, global network such as the Internet. Additionally, the network 140 may include any number of additional devices to facilitate communication between the host computing device 102 and the remote computing device 130. The host computing device 102 and the remote computing device 130 may use any suitable communication protocol to communicate with each other over the network 140 depending on, for example, the particular type of network(s) 140.

The peripheral devices 118 of the host computing device 102 may include any number of additional input/output devices, interface devices, and/or other peripheral devices. For example, the peripheral devices 118 may include a display for displaying content to a user, a keyboard, mouse, or other input/output peripheral device. The peripheral devices 118 are communicatively coupled to the I/O subsystem 110 via a number of signal paths thereby allowing the I/O subsystem 110 and/or processor 104 to receive inputs from and send outputs to the peripheral devices 118.

The remote computing device 130 may be embodied as any type of computing device capable of performing the functions described herein. As such, the remote computing device 130 may include various hardware and software components (e.g., a processor, memory, and communication circuitry) typically found in a computing device for communicating, storing, maintaining, and transferring data over a network. The illustrative remote computing device 130 transmits a packet to the host computing device 102 over the network 140 to remotely trigger the initiation of a wake procedure by one or more components of the host computing device. In some embodiments, the packet comprises a specially formatted network message packet (e.g., a "magic packet"), which is sent to the host computing device 102 to trigger one or more components of the host computing device 102 to turn on or wake up (e.g., transition from a low-power state to an operational power state). Additionally or alternatively, the remote computing device 130 may transmit a wake packet of a specific type (e.g., a TCP SYN packet) to the host computing device 102 to trigger one or more components to wake up. It should be understood that the remote computing device 130 may transmit other types of packets capable of waking up one or more components of the host computing device 102. For example, the remote computing device 130 may transmit wake packets targeting a specific port or range of ports being monitored by the host computing device 102, wake packets comprising specific patterns identifiable by the host computing device 102, and/or any other packet or message suitable for use in triggering the host computing device 102 to transition from a low-power state to an operational power state.

Figure 2:
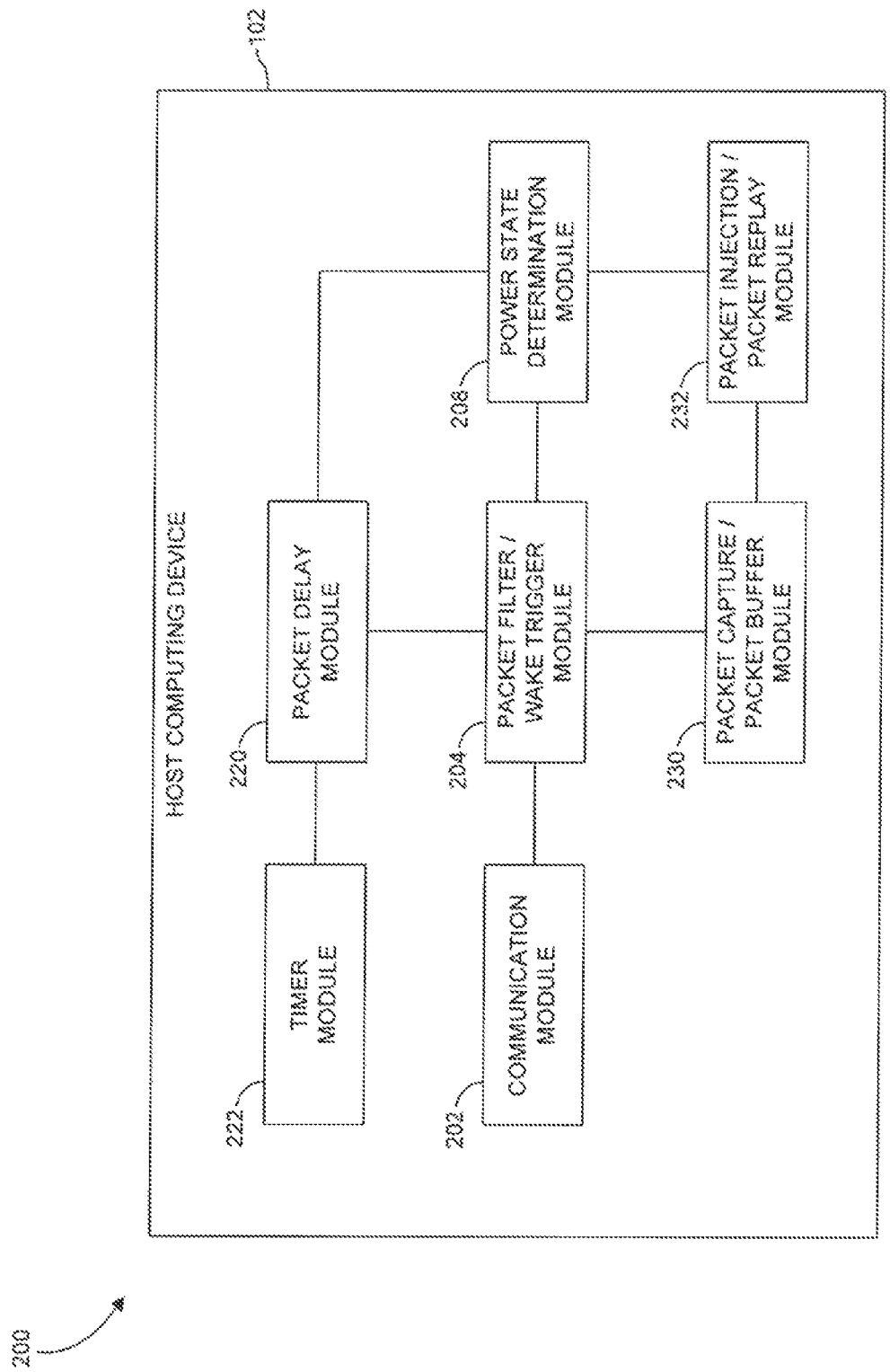
FIG. 2 is a simplified block diagram of at least one embodiment of an environment of a host computing device of the system of FIG. 1.

Referring now to FIG. 2, one embodiment of an environment 200 of the host computing device 102 includes a communication module 202, a packet filter/wake trigger module 204, a power state determination module 208, a packet delay module 220, a timer module 222, a packet capture/packet buffer module 230, and a packet injection/packet replay module 232. It should be understood that the illustrative environment 200 may not always necessarily include all of the modules illustrated in FIG. 2. Rather, in some embodiments, the illustrative environment 200 may instead include some portion or combination of the modules illustrated in FIG. 2. For example, in one embodiment, the illustrative environment 200 may include the communication module 202, the packet filter/wake trigger module 204, the power state determination module 208, the packet delay module 220, and the timer module 222. In other embodiments, the illustrative environment 200 may instead include the communication module 202, the packet filter/wake trigger module 204, the power state determination module 208, the packet capture/packet buffer module 230, and the packet injection/packet replay module 232. Additionally, it should be understood that the environment 200, and/or any of the modules included therein, may be implemented in hardware, firmware, software, or any combination thereof.

As discussed above, in some embodiments, the host computing device 102 may receive a packet from the remote computing device 130 over the network 140. Of course, it should be understood that although only one incoming packet is described in the illustrative embodiment below, any number of incoming packets may be sent by the remote computing device 130 and received by the host computing device 102. Upon receiving the incoming packet, a wake process may be triggered on the host computing device 102 to transition one or more components from a low-power state to an operational power state. In such embodiments, the host computing device 102 may delay delivery of the packet to one or more components (e.g., firmware, hardware, software, operating systems, applications, services, etc.) of the host computing device 102 while achieving a fully operational power state. To do so, the communication module 202 may facilitate communications with the remote computing device 130 over the network 140. Additionally, the communication module 202 of the host computing device 102 and the remote computing device 130 may use any suitable communication protocol to communicate with each other over the network 140 depending on, for example, the particular type of network(s) 140.

The communication module 202 may be communicatively coupled with the packet filter/wake trigger module 204 to facilitate triggering one or more components of the host computing device 102 to transition from a low-power operating state to an operational (e.g. "powered-on," functional, available, ready, etc.) power state. In use, the packet filter/wake trigger module 204 may receive the incoming packet from the communication module 202. Upon receipt of the packet, the packet filter/wake trigger module 204 may parse or otherwise examine the contents of the packet to determine whether to trigger execution of a wake procedure for one or more components of the host computing device 102. To do so, the packet filter/wake trigger module 204 may, in some embodiments, determine that the incoming packet is of a specific type (e.g., a TCP SYN packet) being monitored or destined to a specific port (e.g., TCP 5900, TCP 3389, etc.) on the host computing device 102. Additionally or alternatively, the packet filter/wake trigger module 204 may also determine whether the incoming packet, or the contents thereof, matches one or more filters. In such embodiments, the filters comprise one or more configurable rules, which define one or more patterns, bit masks, offsets, destination ports, packet types, and/or any other information indicative of a packet that should trigger a wake. Upon determining that the incoming packet matches one or more of the filters and, therefore, embodies a wake packet, the packet filter/wake trigger module 204 may trigger and/or initiate a wake-up process on the host computing device 102.

As discussed above, in some embodiments, the host computing device 102 may hold the received packet that triggered the wake process for a reference delay time before releasing the packet for further processing. To facilitate delaying the packet, the packet filter/wake trigger module 204 may be communicatively coupled with the packet delay module 220. The packet delay module 220 may delay delivery of an incoming packet to other components of the host computing device 102 for a reference delay time. In such embodiments, after receiving the incoming packet from the packet filter/wake trigger module 204, the packet delay module 220 may hold and/or buffer the packet for a reference amount of time. For example, the packet delay module 220 may hold the packet for an amount of time configured to be less than the transmission timeout for the remote computing device 130. In response to delaying the packet for the configured amount of time, the packet delay module 220 may release the packet for further processing by one or more other components of the host computing device 102.

The packet delay module 220 may be communicatively coupled with the timer module 222 to facilitate holding and/or buffering the incoming packet for the reference amount of time. The timer module 222 may keep track of an amount of time that has passed since the communication module 202 received the incoming packet from the remote computing device 130. To do so, the timer module 222 may utilize any number of timers, clock signals, counters, algorithms, or any other component of the host computing device 102 suitable for determining the passage of time. In some embodiments, the timer module 222 may determine an amount of time that has passed (e.g., counting up) since the occurrence of a particular event such as, for example, the receipt of the packet from the remote computing device 130. In other embodiments, the timer module 222 may determine an amount of time remaining (e.g., counting down) until the occurrence of an event such as, for example, the expiration of a reference delay timer.

In some embodiments, the packet delay module 220 may also be communicatively coupled with the power state determination module 208 to facilitate delaying and releasing the packet. In such embodiments, the packet delay module 220 may delay delivery of an incoming packet to other components of the host computing device 102 until notification has been received from the power state determination module 208. In use, the power state determination module 208 monitors the power state of one or more components of the host computing device 102. In doing so, the power state determination module 208 may determine that one or more components of the host computing device 102 has successfully transitioned from a low-power state (e.g., a sleep state) to an operational power state (e.g., a state available to process network requests). Of course, it should be understood that the power state determination module 208 may also determine that one or more components of the host computing device 102 has transitioned from an operational power state to a low-power state. To do so, the power state determination module 208 may monitor one or more system firmware, system hardware, and/or software components of the host computing device 102 for transitions in power states. For example, the power state determination module 208 may monitor one or more of Basic Input/Output System (BIOS) information, Advanced Configuration and Power Interface (ACPI) information, or any component suitable for determining power states of the host computing device 102. In response to determining that one or more components has successfully transitioned power states (e.g., from a low-power state to an operational power state), the power state determination module 208 may generate a message indicative of such a transition. For example, the power state determination module 208 may transmit a message, signal, or otherwise to notify the packet delay module 220 that one or more components of the host computing device 102 has successfully transitioned to an operational power state and, as a result, is available to process the delayed packet. It should be understood, however, that in some embodiments, the power state determination module 208 may also monitor any number of ready states (e.g., available, unavailable, limited availability, etc.) of the host computing device 102 and/or the one or more components of the host computing device 102 (e.g., firmware, hardware, software, operating systems, applications, services, etc.).

In embodiments wherein notification is received from the power state determination module 208 that one or more components of the host computing device 102 is available, the packet delay module 220 may release the delayed packed upon receipt of that notification. Additionally or alternatively, it should be understood that in other embodiments, the packet delay module 220 may automatically release a delayed packet in the event that a notification has not been received from the power state determination module 208 within a reference amount of time. In such embodiments, the packet delay module 220 may automatically release the delayed packet if a notification has not been received from the power state determination module 208 within an amount of time configured to be less than the transmission timeout for the remote computing device 130. For example, in order to beat a 21-second transmission timeout associated with an operating system (OS) of the remote computing device 130, the packet delay module 220 may automatically release the delayed packet if a notification from the power state determination module 208 has not been received within 18 seconds. Of course it should be understood that any suitable reference delay time or transmission timeout may instead be used based on, for example, the configuration of the host computing device 102 and/or the remote computing device 130.

Additionally or alternatively, the host computing device 102 in some embodiments may buffer an incoming packet to delay processing until one or more components of the host computing device 102 has transitioned to an operational power state and, therefore, is available to process network requests. It should be understood that although only one incoming packet is described in the illustrative embodiment below, any number of incoming packets may be buffered. Once one or more components of the host computing device 102 is available to process network requests, the host computing device 102 may inject and/or replay the buffered packet to the available component(s). It should be appreciated that in such embodiments, the time to connect may be reduced and/or minimized since the host computing device 102 is not required to wait for the remote computing device 130 to resend the packet, which otherwise would have been lost during execution of a wake process.

In embodiments wherein the host computing device 102 buffers and then replays and/or injects the received packet (e.g., incoming packet), the communication module 202 and the packet filter/wake trigger module 204 may function in a manner similar to that described above. However, to facilitate buffering the received packet, the packet filter/wake trigger module 204 may, additionally or alternatively, be communicatively coupled with the packet capture/packet buffer module 230. In such embodiments, the packet capture/packet buffer module 230 may receive the incoming packet from the packet filter/wake trigger module 204 and thereafter buffer or otherwise store such packet. To do so, the packet capture/packet buffer module 230 may buffer or otherwise store the incoming packet in the data storage 116 or the memory 108 of the host computing device 102. Of course, it should be understood that the packet capture/packet buffer module 230 may buffer and/or store the incoming packet in any suitable data storage and/or memory device (e.g., volatile and/or non-volatile memory devices) of the host computing device 102, including data storage and/or memory embedded within other components of the host computing device 102. For example, the packet capture/ packet buffer module 230 may buffer and/or store the incoming packet within a data storage and/or memory device embedded within the communication circuitry 114 or within the Trusted Execution Environment engine 112.

To facilitate injecting or replaying the buffered and/or stored received packets, the packet injection/packet replay module 232 may be communicatively coupled with the packet capture/packet buffer module 230 and the power state determination module 208. Similar to the packet delay module 220, the packet injection/packet replay module 232 may receive notification (e.g., a message, signal, etc.) from the power state determination module 208 that one or more components of the host computing device 102 has successfully transitioned from a low-power state (e.g., a sleep state) to an operational power state (e.g., a state available to process network requests). Upon receiving notification from the power state determination module 208 that one or more components of the host computing device 102 is available, the packet injection/packet replay module 232 may receive or otherwise obtain the buffered and/or stored packet from the packet capture/packet buffer module 230. Subsequently, the packet injection/packet replay module 232 may inject and/or replay the packet to the one or more available components of the host computing device 102 for further processing.

Figure 3:
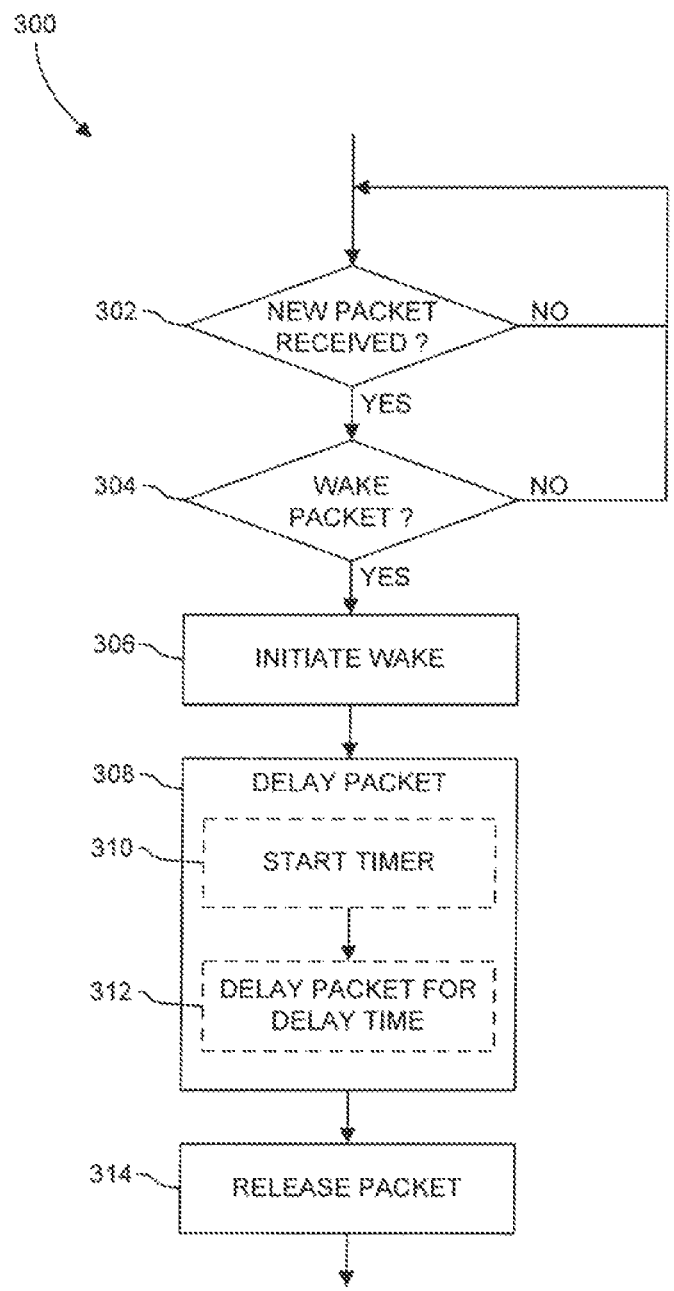
FIG. 3 is a simplified flow diagram of at least one embodiment of a method for delaying and releasing an incoming packet that may be executed by the host computing device of FIGS. 1 and 2 during a network-triggered wake.

Referring now to FIG. 3, a method 300 for delaying and releasing an incoming packet that may be executed by the host computing device 102 during a network-triggered wake begins with block 302. In block 302, the host computing device 102 determines whether a new packet has been received from the remote computing device 130 over the network 140. The host computing device 102 may determine that a new packet has been received from the remote computing device 130 over the network 140 based on communications received by the communication circuitry 114 and/or the communication module 202 as discussed above. As discussed above, the new packet received from the remote computing device 130 may correspond to a packet for initiating a new connection and/or maintaining an existing connection with the host computing device 102. If the host computing device 102 determines that a new packet has been received from the remote computing device 130 over the network 140, the method 300 advances to block 304.

In block 304, the host computing device 102 determines whether the newly received packet from the remote computing device 130 corresponds to a wake packet. To determine whether the newly received packet corresponds to a wake packet, the host computing device 102 may determine that the packet is of a recognized type, targets a specific port or range of ports on the host computing device 102, and/or the contents of the packet match a specific pattern. As discussed above, the host computing device 102 may utilize one or more rule-based filters to facilitate determining whether the newly received packet, or the contents thereof, are indicative of a wake packet. In such embodiments, the newly received packet may represent both a wake packet and a packet to initiate and/or maintain a connection. In response to determining that the newly received packet corresponds to a recognizable wake packet, the method 300 advances to block 306. If, however, the host computing device 102 determines that the newly received packet does not correspond to a recognizable wake packet, the method 300 loops back to block 302 to wait for the receipt of a new packet.

In block 306, the host computing device 102 initiates execution of a wake-up process. As discussed above, during execution of the wake-up process, one or more components of the host computing device 102 may transition from a low-power state (e.g., a sleep power state, a hibernate power state, etc.) to an operational power state (e.g., a "powered-on", a ready, and/or a fully operational power state). Upon initiating execution of the wake-up process for one or more components of the host computing device 102, the method 300 advances to block 308.

In block 308, the host computing device 102 delays delivery of the packet while one or more components achieves a fully operational power state or a ready state. To do so, the host computing device 102 may hold the packet for a time equal to a configurable reference delay time. After delaying delivery of the packet for the configurable reference delay time, the method 300 advances to block 314 in which the host computing device 102 releases the delayed packet to one or more components for further processing.

Additionally or alternatively, to facilitate delaying delivery of the packet in block 308, the host computing device 102 in some embodiments may utilize any number of timers, clock signals, counters, algorithms, or any other component of the host computing device 102 suitable for determining the passage of time. In such embodiments, the method 300 advances to block 310, wherein the host computing device 102 starts a timer upon receiving the packet from the remote computing device 130. In doing so, the host computing device 102 determines how much time has passed since the packet was received and the method 300 advances to block 312.

In block 312, the host computing device 102 may determine that the amount of time passed is equal to the configurable reference delay time. In response to determining that the amount of time passed matches the amount of time configured for the reference delay time, the method 300 advances to block 314 in which the host computing device 102 releases the delayed packet for further processing. It should be appreciated that in such embodiments, the overall time to connect may be reduced and/or minimized as the host computing device 102 is not required to wait for the remote computing device 130 to resend the initial packet, which otherwise would have been lost.

Figure 4:
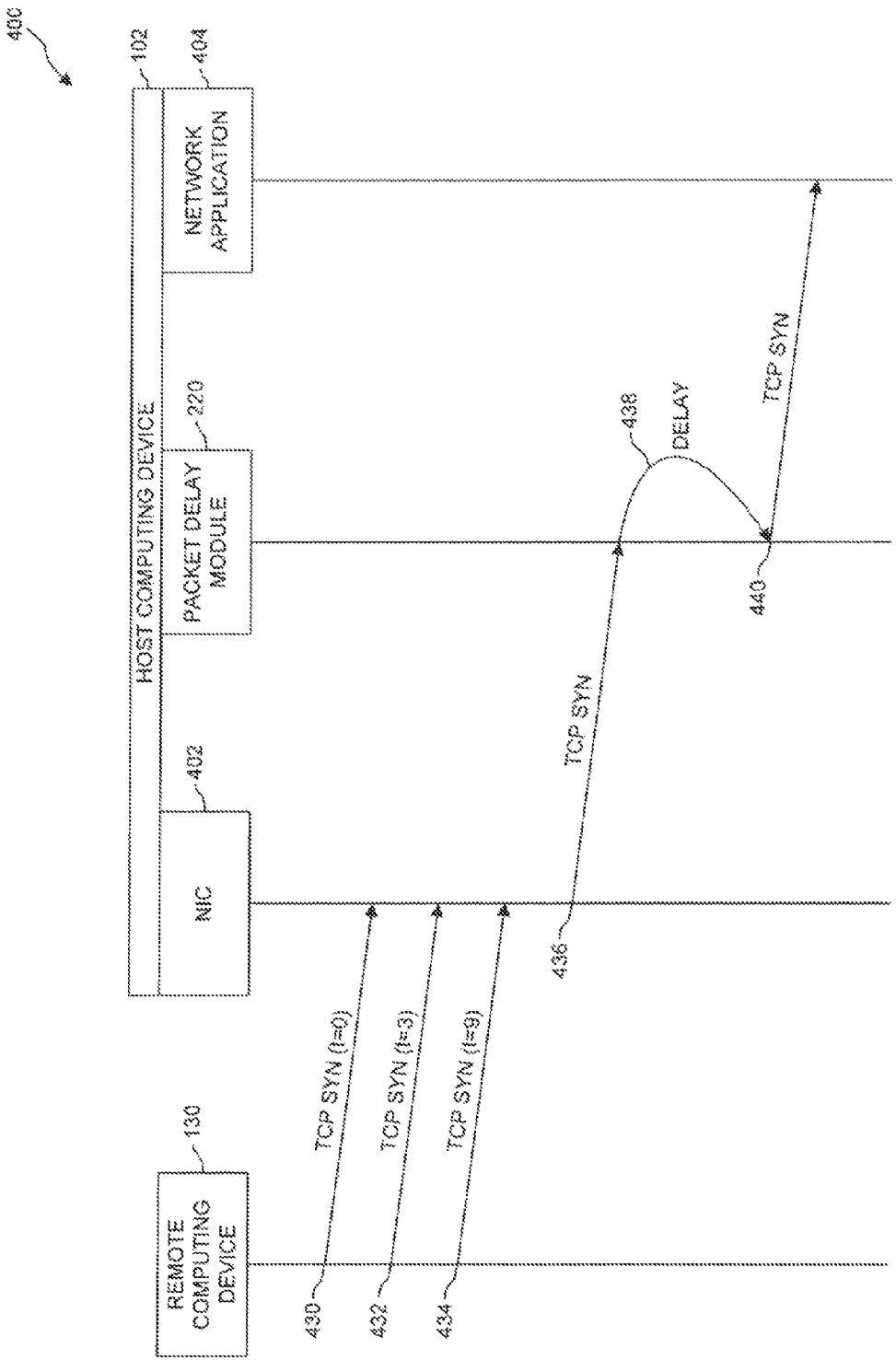
FIG. 4 is a simplified activity flow diagram of at least one embodiment of the method of FIG. 3 for delaying and releasing an incoming packet.

Referring now to FIG. 4, a simplified flow diagram of at least one embodiment of a method 400 for delaying and releasing an incoming packet that may be executed by the host computing device 102 during a network-triggered wake is shown. In operation, a network interface controller (NIC) 402 of the host computing device 102 may receive a incoming packet 430 from the remote computing device 130. In some embodiments, the NIC 402 may also receive incoming packets 432, 434, which may correspond to retry packets attempted by the remote computing device 130. In illustrative embodiment, the incoming packets 430, 432, 434 may correspond to a specific type of packet (e.g., a TCP SYN packet) for initiating a new connection and/or maintaining an existing connection.

In some embodiments, receipt of the initial incoming packet may trigger a wake-up process to be initiated for one or more components of the host computing device 102. Thereafter, the NIC 402 may forward the packet 430 to the packet delay module 220 in data transmission 436. Subsequently, the packet delay module 220 may hold and/or buffer the packet for a reference amount of time 438. For example, in some embodiments, the packet delay module 220 may hold the packet for an amount of time configured to be less than the transmission timeout for the remote computing device 130. Additionally or alternatively, the packet delay module 220 may hold the packet until a notification is received indicating that one or more components of the host computing device is ready to process the packet further.

In embodiments wherein the packet is held for a reference amount of time, the packet delay module 220 releases the delayed packet for further processing by one or more components of the host computing device 102 in data transmission 440. For example, in some embodiments, the packet delay module 220 may release the delayed packet to a network application 404 executing on the host computing device 102 in data flow 440. It should be understood, however, that the packet delay module 220 may instead release the delayed packet to other destinations and/or components executing on the host computing device 102. For example, in some embodiments, the packet delay module 220 may release the delayed packet to an OS, a driver, and/or any suitable component or application executing on the host computing device 102.

Figure 5:
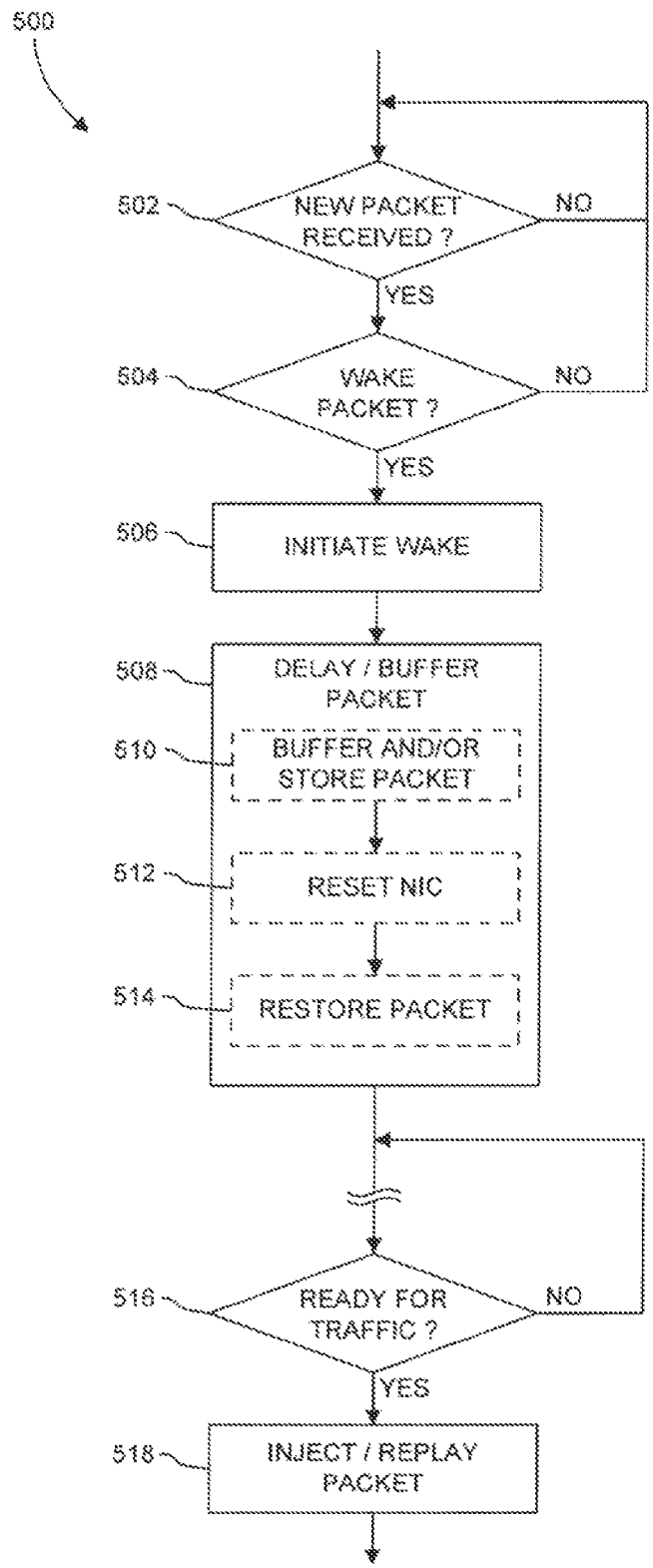
FIG. 5 is a simplified flow diagram of at least one embodiment of a method for buffering and injecting or replaying an incoming packet to introduce a delay that may be executed by the host computing device of FIGS. 1 and 2 during a network-triggered wake.

Referring now to FIG. 5, a method 500 for buffering and injecting and/or replaying an incoming packet to introduce delay that may be executed by the host computing device 102 during a network-triggered wake begins with block 502. In block 502, the host computing device 102 determines whether a new packet has been received from the remote computing device 130 over the network 140. The host computing device 102 may determine that a new packet has been received from the remote computing device 130 over the network 140 based on communications received by the communication circuitry 114 and/or the communication module 202 as discussed above. If the host computing device 102 determines that a new packet has been received from the remote computing device 130 over the network 140, the method 500 advances to block 504.

In block 504, the host computing device 102 determines whether the newly received packet from the remote computing device 130 corresponds to a wake packet. To determine whether the newly received packet corresponds to a wake packet, the host computing device may determine that the packet is of a recognized type, targets a specific port or range of ports on the host computing device 102, and/or the contents of the packet match a specific pattern. As discussed above, the host computing device 102 may utilize one or more rule-based filters to facilitate determining whether the newly received packet, or the contents thereof, are indicative of a wake packet. In response to determining that the newly received packet corresponds to a recognizable wake packet, the method 500 advances to block 506. In such embodiments, the newly received packet may represent both a wake packet and a packet to initiate and/or maintain a connection. If, however, the host computing device 102 determines that the newly received packet does not correspond to a recognizable wake packet, the method 500 loops back to block 502 to wait for a new packet to be received.

In block 506, the host computing device 102 initiates execution of a wake-up process. As discussed above, during execution of the wake-up process, one or more components of the host computing device 102 transitions from a low-power state (e.g., a sleep power state, a hibernate power state, etc.) to an operational power state (e.g., a "powered-on," a ready, and/or fully operational power state). Upon initiating execution of the wake-up process for one or more components of the host computing device 102, the method 500 advances to block 508.

In block 508, the host computing device 102 delays delivery of the packet while one or more components achieves a fully operational power state. To do so, the host computing device 102 may hold or otherwise delay delivery of the packet until being notified that one or more components are available to process the delayed packet. In doing so, the host computing device 102 may improve connection reliability and responsiveness with the remote computing device 130 during all or a portion of the execution of the wake-up process. In response to holding the packet, the method 500 advances to block 516.

In block 516, the host computing device 102 determines whether one or more components have successfully transitioned from a low-power state (e.g., a sleep state) to an operational power state (e.g., a state ready and/or available to process network requests). As discussed above, the host computing device 102 may monitor one or more system firmware, system hardware, and/or software components (e.g., BIOS, ACPI, etc.) to detect transitions in power states. For example, in some embodiments, the host computing device 102 may monitor ACPI information for one or more components to detect power state transitions. It should be understood that the host computing device 102 may monitor other power-managed states in addition to the sleep and operational (e.g., "powered-on") power states. For example, the host computing device 102 may, additionally or alternatively, monitor components for transitions to/from a hibernate power state, a "powered-off" or otherwise powered-down power state, or any other power state capable of being monitored by the host computing device 102. It should be understood, however, that in some embodiments, the host computing device 102 may also monitor any number of ready states (e.g., available, unavailable, limited availability, etc.) of one or more components (e.g., firmware, hardware, software, operating systems, applications, services, etc.).

Referring back to block 516, in embodiments wherein the host computing device 102 determines that one or more components has transitioned from a low-power state to an operational power state, the host computing device 102 generates a notification (e.g., a message, signal, etc.) indicating which components are available to process the delayed packet further. In doing so, the method 500 advances to block 518 in which the host computing device 102 injects and/or replays the delayed packet to the one or more available components. If, however, the host computing device 102 determines that no components are available to further process the delayed packet, the method 500 loops back to block 516 to wait for one or more components to transition from a low-power state to an operational power state.

Referring back to block 508, the host computing device 102 may buffer and/or store an incoming packet to facilitate delaying delivery of the packet to one or more components. In doing so, the host computing device 102 may improve connection reliability and responsiveness with the remote computing device 130 during all or a portion of the execution of the wake-up process. For example, in block 510, the host computing device 102 may buffer or otherwise store the incoming packet in the data storage 116 or the memory 108 of the host computing device 102. As discussed above, it should be understood that host computing device 102 may buffer and/or store the incoming packet in any suitable data storage and/or memory device (e.g., volatile and/or non-volatile memory devices) of the host computing device 102, including data storage and/or memory embedded within other components of the host computing device 102. For example, the host computing device 102 may buffer and/or store the incoming packet within a data storage and/or memory device embedded within the communication circuitry 114 or within the Trusted Execution Environment engine 112. Upon buffering and/or storing the incoming packet in the data storage 116 or the memory 108, the method 500 advances to block 512.

In block 512, the host computing device 102 may reset or otherwise reinitialize the communication circuitry 114 after initiating execution of a wake-up process. In some embodiments, the reset may comprise a hard reset or a soft reset of the communication circuitry 114. After resetting or otherwise reinitializing the communication circuitry 114, the method 500 advances to block 514.

In block 514, the host computing device 102 restores the packet buffered or otherwise stored in the data storage 116 or the memory 108 to the communication circuitry 114. Once the buffered packet has been restored to the communication circuitry 114, the method 500 advances to blocks 516 and 518 as described above.

Figure 6:
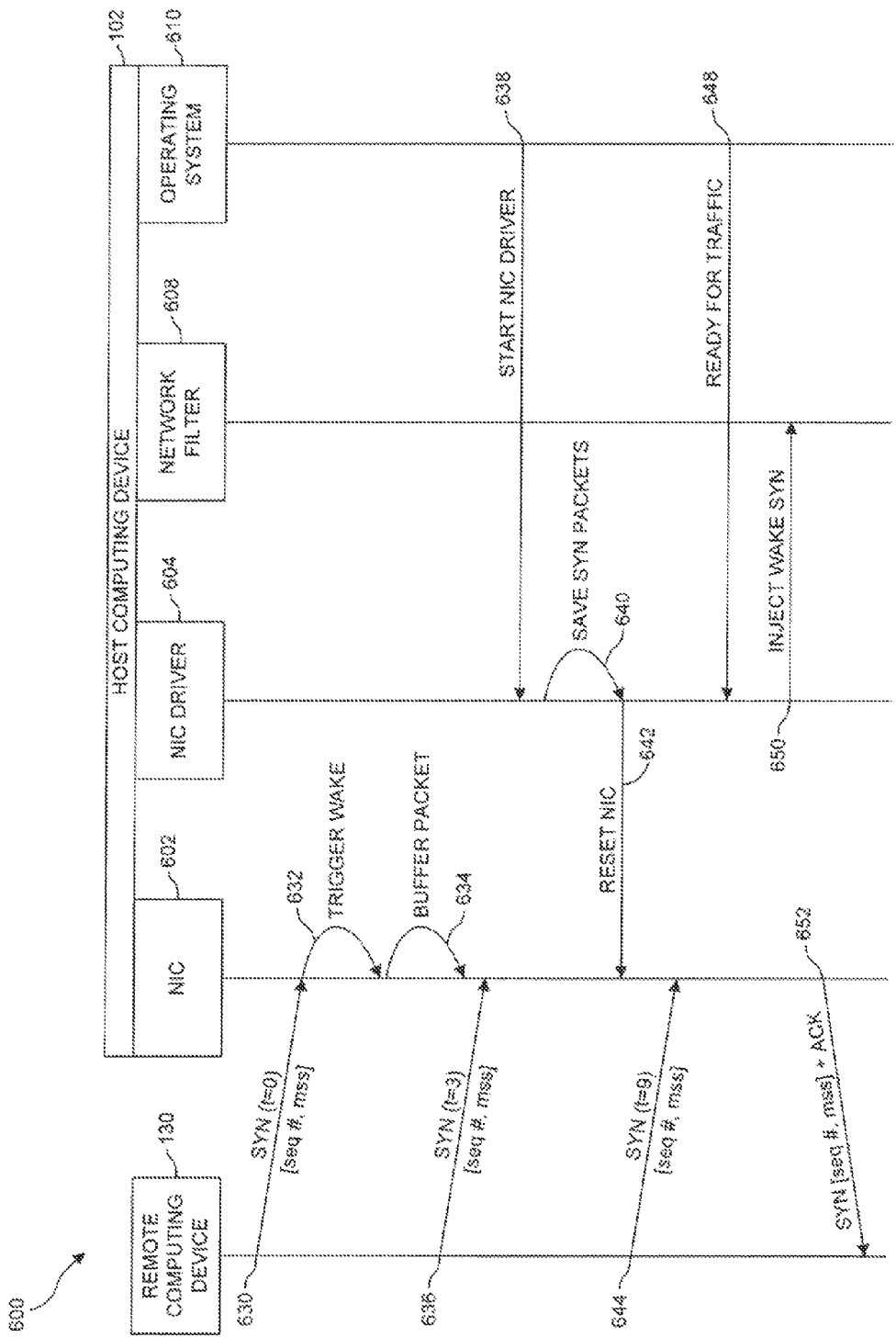
FIG. 6 is a simplified activity flow diagram of at least one embodiment of the method of FIG. 5 for buffering and injecting or replaying an incoming packet.

Referring now to FIG. 6, a simplified flow diagram of at least one embodiment of a method 600 for buffering and injecting and/or replaying an incoming packet to introduce delay that may be executed by the host computing device 102 during a network-triggered wake is shown. In doing so, the host computing device 102 may improve connection reliability and responsiveness with the remote computing device 130 during all or a portion of the execution of a wake-up process. In operation, a network interface controller (NIC) 602 of the host computing device 102 may receive a incoming packet 630 from the remote computing device 130. In some embodiments, the NIC 602 may also receive additional incoming packets 636, 644, which may correspond to retried packet attempts by the remote computing device 130. In the illustrative embodiment, the incoming packets 630, 636, 644 may correspond to a specific type of packet (e.g., a SYN packet) for initiating a new connection and/or maintaining an existing connection.

As discussed above, receipt of the initial packet 630 may trigger a wake process to be initiated for one or more components of the host computing device 102 in data flow 632. Thereafter, the NIC 602 may buffer the initial packet 630 in the data storage 116 and/or the memory 108 of the host computing device 102 in data flow 634. As discussed above, it should be understood that the NIC 602 may buffer the initial packet 630 and/or any one of the retry packets 636, 644 in any suitable data storage and/or memory device (e.g., volatile and/or non-volatile memory devices) of the host computing device 102, including those embedded within other components. For example, the NIC 602 may temporarily buffer the initial packet 630 within a data storage and/or memory device embedded within the communication circuitry 114 or within the Trusted Execution Environment engine 112.

After buffering the initial packet 630 in the data storage 116 and/or the memory 108, an operating system (OS) 610 executing on the host computing device 102 may send one or more messages and/or commands to a NIC driver 604 associated with the NIC 602 in data transmission 638. In some embodiments, the NIC driver 604 may store or otherwise save the temporarily buffered packet 630 in the data storage 116 and/or the memory 108. It should be understood that the same data storage 116 and/or the memory 108 used to temporarily buffer the initial packet 630 may also be used by the NIC driver 604 to save the initial packet 630.

In response to saving the initial packet 630 in the data storage 116 and/or the memory 108, the NIC driver 604 may send a command or otherwise instruct the NIC 602 to reset or otherwise reinitialized in data communication 642. As discussed above, the NIC 602 may perform either hard reset or a soft reset. After being reset or otherwise reinitialized, the NIC driver 604 may restore the initial packet 630 stored in the data storage 116 and/or the memory 108.

After restoring the initial packet 630 from the data storage 116 and/or the memory 108, the NIC driver 604 may wait for notification that the OS 610 is ready and available to receive network traffic. As such, once the OS 610 is ready to further process the initial packet 630, the OS 610 notifies the NIC driver 604 that it is ready to receive network traffic in data transmission 648.

In some embodiments, upon receiving notification that the OS 610 is ready for network traffic, the NIC driver 604 may inject and/or replay the initial packet 630 to a network filter 608 for further processing in data transmission 650. Although the NIC driver 604 injects and/or replays the initial packet 630 to the network filter 608, it should be understood that the NIC driver 604 may instead inject and/or replay the initial packet 630 to the OS 610 and/or other components of the host computing device 102. Additionally or alternatively, although the NIC driver 604 injects and/or replays the initial packet 630 in the illustrative embodiment, it should be appreciated that one or more other components (e.g., firmware, hardware, software, operating systems, applications, services, etc.) of the host computing device 102 may inject and/or replay the initial packet 630. For example, in some embodiments, one or more firmware and/or hardware components of the NIC 602, a network filter of an OS stack, a component of the OS, and/or any suitable component in the network path may inject or replay the initial packet 630.

After the NIC driver 604 injects and/or replays the initial packet 630, the NIC 602 may generate and transmit an acknowledgement to the remote computing device 130 at data transmission 652. In some embodiments, the acknowledgment transmitted to the remote computing device 130 comprises a message acknowledging receipt of the initial packet 630. It should be appreciated that in such embodiments the overall time to connect may be reduced and/or minimized since the host computing device 102 is not required to wait for the remote computing device 130 to resend the initial packet 630, which otherwise would have been lost during execution of the wake process.

Figure 7:
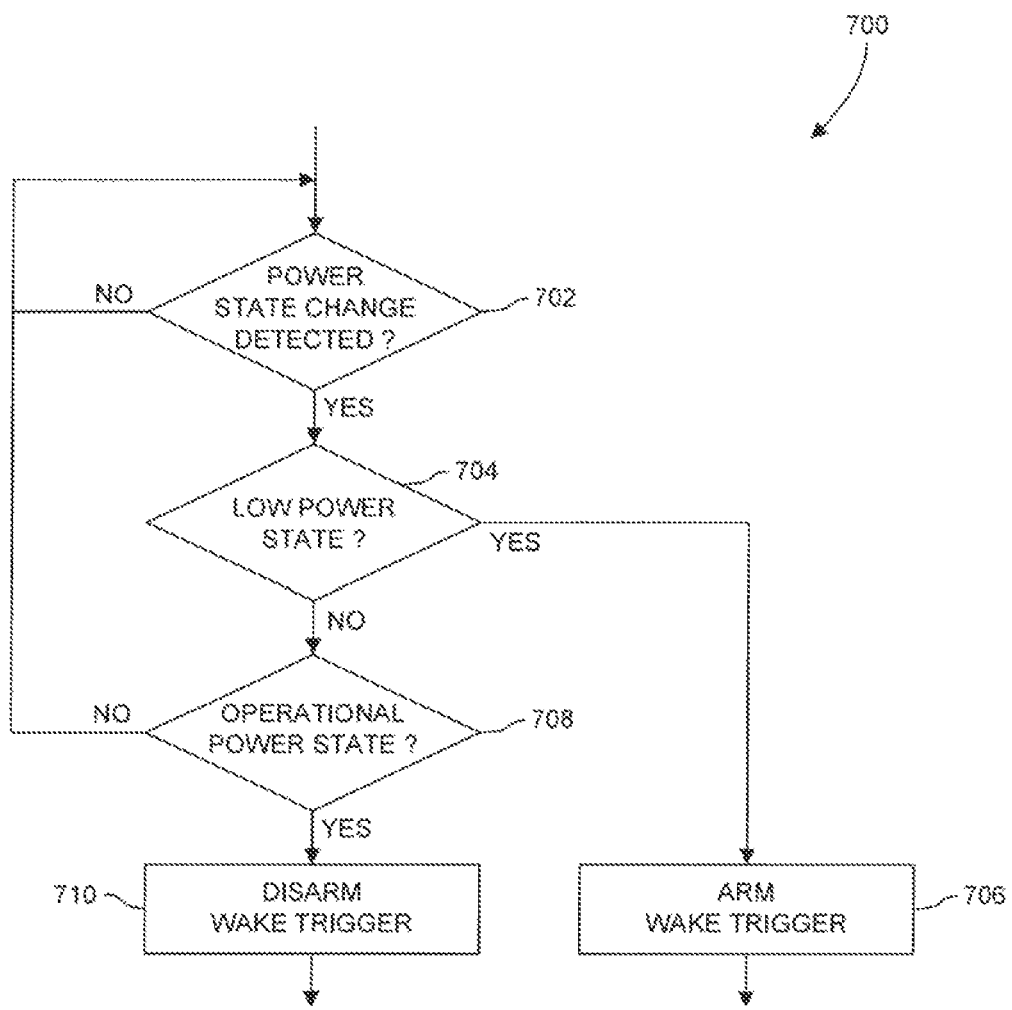
FIG. 7 is a simplified flow diagram of at least one embodiment of a method for enabling and disabling the delay of incoming packets by the system of FIG. 1.

Referring now to FIG. 7, a method 700 for enabling and disabling the delay of an incoming packet that may be executed by the host computing device 102 begins with block 702. In block 702, the host computing device 102 monitors the power state of one or more components. In doing so, the host computing device 102 may determine that one or more components has successfully transitioned from one power state to another power state. For example, the host computing device 102 may determine that one or more components has transitioned from a low-power state (e.g., a sleep state, hibernate state, powered-off state, etc.) to an operational power state (e.g., a state ready and/or available to process network requests). Of course, the host computing device 102 may also determine that one or more components has transitioned from an operational power state to a low-power state or any other power-managed state suitable for use with the host computing device 102. To do so, the host computing device 102 may monitor one or more device firmware, device hardware, and/or software components for transitions in power states. For example, the host computing device 102 may monitor Basic Input/Output System (BIOS) information, Advanced Configuration and Power Interface (ACPI) information, or any component suitable for determining power states of the host computing device 102. Additionally or alternatively, in some embodiments, the host computing device 102 may also monitor any number of ready states (e.g., available, unavailable, limited availability, etc.) of one or more components (e.g., firmware, hardware, software, operating systems, applications, services, etc.).

To facilitate determining whether the power state of one or more components has transitioned, the host computing device 102 may, in some embodiments, store data indicative of a previous power state for each of the one or more components in the data storage 116 and/or the memory 108. It should be understood that the data indicative of the previous power state for each of the components may be stored in a database, a table, or any other format suitable for storing a power state for one or more components of the host computing device 102. In such embodiments, the host computing device 102 may compare the previous power state with a current power state for each of the one or more components. If the previous power state of a component is different than the current power state, the host computing device 102 may determine that the power state of that component has transitioned.

In some embodiments, the host computing device 102 may continuously monitor the one or more firmware, hardware, and/or software components for transitions in power states and/or operational states. In other embodiments, the host computing device 102 may monitor the one or more firmware, hardware, and/or software components for transitions in power states and/or operational states at configurable, predefined time intervals. Additionally or alternatively, the host computing device 102 may receive a notification from one or more of the firmware, hardware, and/or software components that a power state and/or an operational state transition has occurred. Of course, it should be understood, however, that the host computing device 102 may monitor for transitions in power state and/or operational state at any suitable interval.

Returning back to block 702, if the host computing device 102 determines that one or more components has transitioned power states and/or operational states, the method 700 advances to block 704. However, if the host computing device 102 at block 702 determines that no components of the host computing device 102 have transitioned power states and/or operational states, the method 700 loops back to block 702 to continue monitoring for power state and/or operational state transitions. It should be understood that, in some embodiments, the power state and/or operational state of specific components may be monitored by the host computing device 102. For example, the host computing device 102 may determine that the power state of a first component has transitioned from a low-power state to an operational power state; however, the power state of a second component, which may be required for further processing of an incoming packet of a particular type, has not transitioned power states. As a result, the host computing device 102 may continue to monitor for a power state transition by the second component.

In block 704, after determining that one or more components have transitioned power states and/or operational states, the host computing device 102 determines whether the one or more components have transitioned to a low-power state (e.g., a sleep state, a hibernate state, a powered-off state, etc.). To do so, the host computing device 102 may obtain current power state and/or operational state information for the one or more components from the one or more firmware, hardware, and/or software components of the host computing device 102. If at block 704, the host computing device 102 determines that the one or more components have not transitioned to a low-power state, the method 700 advances to block 708.

In block 708, the host computing device 102 determines whether the one or more components have instead transitioned to an operational power state (e.g., a state available to process network requests). As discussed above, the host computing device 102 may obtain current power state and/or operational state information for the one or more components from the one or more firmware, hardware, and/or software components of the host computing device 102. If at block 708, the host computing device 102 determines that the one or more components have instead transitioned to an operational power state, the method 700 advances to block 710. If, however, the host computing device 102 determines that the one or more components have not transitioned to an operational power state, the method 700 loops back to block 702 to continue monitoring for power state transitions.

In block 710, the host computing device 102 disarms a wake trigger for remotely waking one or more components. In some embodiments, the host computing device 102 may disarm or otherwise disable one or more filters and/or rules used to determine whether incoming packets comprise a wake packet. In doing so, the host computing device 102 may not examine incoming packets using the one or more filters and/or rules.

Returning back to block 704, if the host computing device 102 determines that the one or more components have transitioned to a low-power state, the method 700 advances to block 706 in which the host computing device 102 arms or otherwise enables one or more filters/and or rules used to determine whether incoming packets comprise a wake packet. In doing so, the host computing device 102 may examine incoming packets using the one or more filters and/or rules.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, a computing device for delaying delivery of an incoming packet, the computing device may include a communication module, a wake trigger module, and a packet delay module. In an example, the communication module may receive a packet from a remote computing device over a network. In an example, the wake trigger module may initiate a transition from a low-power power-managed state to an operational power-managed state in response to the packet received from the remote computing device. In an example, the packet delay module may delay delivery of the packet during the transition from the low-power power-managed state to the operational power-managed state.

Additionally, in an example, the computing device may further include a timer module. In an example, the timer module may determine an amount of time passed since receipt of the packet. In an example, the packet delay module may delay delivery of the packet for a reference amount of time. Additionally, in an example, the packet delay module may further release the packet after passage of the reference amount of time. In an example, the reference amount of time may include an amount of time less than a transmission timeout of the remote computing device.

Additionally, in an example, the computing device may further include a power state determination module. In an example, the power state determination module may further determine one or more current power-managed states. In an example, the power state determination module may further generate a notification indicating completion of the transition from the low-power power-managed state to the operational power-managed state.

Additionally, in an example, the packet delay module may further receive the notification indicating completion of the transition from the low-power power-managed state to the operational power-managed state and release the packet in response to receiving the notification indicating the completion of the transition from the low-power power-managed state to the operational power-managed state.

Additionally, in an example, the packet may include one of a magic packet, a packet of a reference type, a packet destined to a reference port, or a packet formed from a reference pattern. In an example, the wake trigger module may further apply one or more filters to the packet received from the remote computing device and determine whether the packet matches one of a reference type, a reference destination port, or a reference pattern. Additionally, in an example, the wake trigger module may initiate a transition from a low-power power-managed state to an operational power-managed state as a function of the packet matching one of the reference type, the reference destination port, or the reference pattern.

In another example, a computing device for delaying delivery of an incoming packet may include a communication module, a communication module, and a packet buffer module. In an example, the communication module may receive a packet from a remote computing device over a network. In an example, the wake trigger module may initiate a transition from a low-power power-managed state to an operational power-managed state in response to the packet received from the remote computing device. In an example, the packet buffer module may buffer the packet during the transition from the low-power power-managed state to the operational power-managed state.

Additionally, in an example, the computing device my further include a power state determination module. In an example, the power state determination module may determine one or more current power-managed states. In an example, the power state determination module may further generate a notification indicating completion of the transition from the low-power power-managed state to the operational power-managed state. In an example, the computing device may further include a packet injection module. In an example, the packet injection module may obtain the packet from the packet buffer module and inject the packet in response to receiving the notification indicating the completion of the transition from the low-power power-managed state to the operational power-managed state. In an example, the computing device may further include a packet replay module. In an example, the packet replay module may obtain the packet from the packet buffer module and replay the packet in response to receiving the notification indicating the completion of the transition from the low-power power-managed state to the operational power-managed state.

Additionally, in an example, the packet may include one of a magic packet, a packet of a reference type, a packet destined to a reference port, or a packet formed from a reference pattern. In an example, the wake trigger module may further apply one or more filters to the packet received from the remote computing device and determine whether the packet matches one of a reference type, a reference destination port, or a reference pattern. Additionally, in an example, the wake trigger module may initiate a transition from a low-power power-managed state to an operational power-managed state as a function of the packet matching one of the reference type, the reference destination port, or the reference pattern.

In another example, a method for delaying delivery of an incoming packet may include receiving, by a host computing device, a packet from a remote computing device over a network. In an example, the method may further include initiating, by the host computing device, a transition from a low-power power-managed state to an operational power-managed state in response to receiving the packet from the remote computing device. In an example, the method may further include delaying, by the host computing device, delivery of the packet during the transition from the low-power power-managed state to the operational power-managed state.

Additionally, in an example, the method may further include determining, by the host computing device, an amount of time passed since receiving the packet from the remote computing device. In an example, delaying delivery of the packet may include delaying delivery of the packet for a reference amount of time. Additionally, in an example, the method may include releasing, by the host computing device, the packet after passage of the reference amount of time. In an example, the reference amount of time may include an amount of time less than a transmission timeout of the remote computing device.

In an example, the method may further include determining, by the host computing device, one or more current power-managed states. Additionally, in an example, the method may further include generating, by the host computing device, a notification indicating completion of the transition from the low-power power-managed state to the operational power-managed state. In an example, the method may include releasing, by the host computing device, the packet in response to receiving the notification indicating the completion of the transition from the low-power power-managed state to the operational power-managed state.

Additionally, in an example, the packet may include one of a magic packet, a packet of a reference type, a packet destined to a reference port, or a packet formed from a reference pattern. In an example, the method may further include applying, by the host computing device, one or more filters to the packet received from the remote computing device and determining whether the packet matches one of a reference type, a reference destination port, or a reference pattern. Additionally, in an example, initiating a transition from a low-power power-managed state to an operational power-managed state may include initiating a transition from a low-power power-managed state to an operational power-managed state as a function of the packet matching one of the reference type, the reference destination port, or the reference pattern.

In another example, a method for delaying delivery of an incoming packet may include receiving, by a host computing device, a packet from a remote computing device over a network. In an example, the method may further include initiating, by the host computing device, a transition from a low-power power-managed state to an operational power-managed state in response to receiving the packet from the remote computing device. In an example, the method may further include buffering, by the host computing device, the packet during the transition from the low-power power-managed state to the operational power-managed state.

Additionally, in an example, the method may include determining, by the host computing device, one or more current power-managed states. In an example, the method may further include generating, by the host computing device, a notification indicating completion of the transition from the low-power power-managed state to the operational power-managed state. Additionally, in an example, the method may further include injecting, by the host computing device, the packet in response to receiving the notification indicating the completion of the transition from the low-power power-managed state to the operational power-managed state. Additionally, in an example, the method may further include replaying, by the host computing device, the packet in response to receiving the notification indicating the completion of the transition from the low-power power-managed state to the operational power-managed state.

In an example, the packet may include one of a magic packet, a packet of a reference type, a packet destined to a reference port, or a packet formed from a reference pattern. Additionally, in an example, the method may include applying, by the host computing device, one or more filters to the packet received from the remote computing device and determining whether the packet matches one of a reference type, a reference destination port, or a reference pattern. Additionally, initiating a transition from a low-power power-managed state to an operational power-managed state may include initiating a transition from a low-power power-managed state to an operational power-managed state as a function of the packet matching one of the reference type, the reference destination port, or the reference pattern.

What is claimed is:

1. A computing device to delay delivery of an incoming packet, the computing device comprising:
    a processor; and
    a memory having stored therein a plurality of instructions that, when executed by the processor, causes the computing device to:
        receive a packet from a remote computing device over a network;
        initiate a transition from a low-power power-managed state to an operational power-managed state in response to the packet received from the remote computing device;
        delay delivery of the packet during the transition from the low-power power-managed state to the operational power-managed state for a reference amount of time, wherein the reference amount of time comprises an amount of time that is less than a transmission timeout of the remote computing device; and
        release the packet after passage of the reference amount of time.

2. The computing device of claim 1, wherein the plurality of instructions, when executed by the processor, further causes the computing device to (i) determine one or more current power-managed states and (ii) generate a notification indicative of completion of the transition from the low-power power-managed state to the operational power-managed state.

3. The computing device of claim 2, wherein the plurality of instructions, when executed by the processor, further causes the computing device to (i) receive the notification indicative of completion of the transition from the low-power power-managed state to the operational power-managed state and (ii) release the packet in response to receiving the notification indicative of the completion of the transition from the low-power power-managed state to the operational power-managed state.

4. The computing device of claim 1, wherein the plurality of instructions, when executed by the processor, further causes the computing device to apply one or more filters to the packet received from the remote computing device to determine whether the packet matches one of a reference type, a reference destination port, or a reference pattern; and
    wherein to initiate a transition from a low-power power-managed state to an operational power-managed state comprises to initiate a transition from a low-power power-managed state to an operational power-managed state as a function of a determination that the packet matches one of the reference type, the reference destination port, or the reference pattern.

5. The computing device of claim 1, wherein the plurality of instructions, when executed by the processor, further causes the computing device to:
    receive a second packet from the remote computing device over the network;
    delay delivery of the second packet during the transition for the reference amount of time; and
    release the second packet after passage of the reference amount of time.

6. The computing device of claim 1, wherein to initiate the transition from the low-power power-managed state to the operational power-managed state comprises to initiate a transition of one or more components of the computing device from a low-power power-managed state to an operational power-managed state without initiation of a transition of other components of the computing device from the low-power power-managed state to the operational power-managed state.

7. One or more non-transitory machine readable media comprising a plurality of instructions stored thereon, which in response to execution by a computing device, cause the computing device to:
    receive a packet from a remote computing device over a network;
    initiate a transition from a low-power power-managed state to an operational power-managed state in response to the packet received from the remote computing device;
    delay delivery of the packet during the transition from the low-power power-managed state to the operational power-managed state for a reference amount of time, wherein the reference amount of time comprises an amount of time that is less than a transmission timeout of the remote computing device; and
    release the packet after passage of the reference amount of time.

8. The one or more non-transitory machine readable media of claim 7, wherein the plurality of instructions further cause the computing device to:
    determine one or more current power-managed states; and
    generate a notification indicative of completion of the transition from the low-power power-managed state to the operational power-managed state.

9. The one or more non-transitory machine readable media of claim 8, wherein the plurality of instructions further cause the computing device to release the packet in response to receipt of the notification indicative of the completion of the transition from the low-power power-managed state to the operational power-managed state.

10. The one or more non-transitory machine readable media of claim 7, wherein the plurality of instructions further cause the computing device to apply one or more filters to the packet received from the remote computing device to determine whether the packet matches one of a reference type, a reference destination port, or a reference pattern; and wherein to initiate a transition from a low-power power-managed state to an operational power-managed state comprises to initiate a transition from a low-power power-managed state to an operational power-managed state as a function of a determination that the packet matches one of the reference type, the reference destination port, or the reference pattern.

11. The one or more non-transitory machine readable media of claim 7, wherein the plurality of instructions further cause the computing device to:

receive a second packet from the remote computing device over the network;

delay delivery of the second packet during the transition for the reference amount of time; and release the second packet after passage of the reference amount of time.

12. A computing device to delay delivery of an incoming packet, the computing device comprising:

a processor; and a memory having stored therein a plurality of instructions that, when executed by the processor, causes the computing device to:

receive a packet from a remote computing device over a network;

initiate a transition from a low-power power-managed state to an operational power-managed state in response to the packet received from the remote computing device;

buffer the packet during the transition from the low-power power-managed state to the operational power-managed state;

generate a notification indicative of completion of the transition from the low-power power-managed state to the operational power-managed state; and inject or replay the packet in response to receiving the notification indicative of the completion of the transition from the low-power power-managed state to the operational power-managed state.

13. The computing device of claim 12, wherein the packet comprises one of a magic packet, a packet of a reference type, a packet destined to a reference port, or a packet formed from a reference pattern.

14. The computing device of claim 12, wherein the plurality of instructions, when executed by the processor, further causes the computing device to apply one or more filters to the packet received from the remote computing device to determine whether the packet matches one of a reference type, a reference destination port, or a reference pattern; and wherein to initiate a transition from a low-power power-managed state to an operational power-managed state comprises to initiate a transition from a low-power power-managed state to an operational power-managed state as a function of a determination that the packet matches one of the reference type, the reference destination port, or the reference pattern.

15. The computing device of claim 12, wherein the plurality of instructions, when executed by the processor, further causes the computing device to:

receive a second packet from the remote computing device over the network; and buffer the second packet during the transition from the low-power power-managed state to the operational power-managed state.

16. One or more non-transitory machine readable media comprising a plurality of instructions stored thereon, which in response to execution by a computing device, cause the computing device to:

receive a packet from a remote computing device over a network;

initiate a transition from a low-power power-managed state to an operational power-managed state in response to the packet received from the remote computing device;

buffer the packet during the transition from the low-power power-managed state to the operational power-managed state;

generate a notification indicative of completion of the transition from the low-power power-managed state to the operational power-managed state; and inject or replay the packet in response to receiving the notification indicative of the completion of the transition from the low-power power-managed state to the operational power-managed state.

17. The one or more non-transitory machine readable media of claim 16, wherein the plurality of instructions further cause the computing device to apply one or more filters to the packet received from the remote computing device to determine whether the packet matches one of a reference type, a reference destination port, or a reference pattern; and wherein to initiate a transition from a low-power power-managed state to an operational power-managed state comprises to initiate a transition from a low-power power-managed state to an operational power-managed state as a function of a determination that the packet matches one of the reference type, the reference destination port, or the reference pattern.

18. The one or more non-transitory machine readable media of claim 16, wherein the plurality of instructions further cause the computing device to:

receive a second packet from the remote computing device over the network;

buffer the second packet during the transition from the low-power power-managed state to the operational power-managed state.

\* \* \* \* \*